United States Patent Office 3,764,462
Patented Oct. 9, 1973

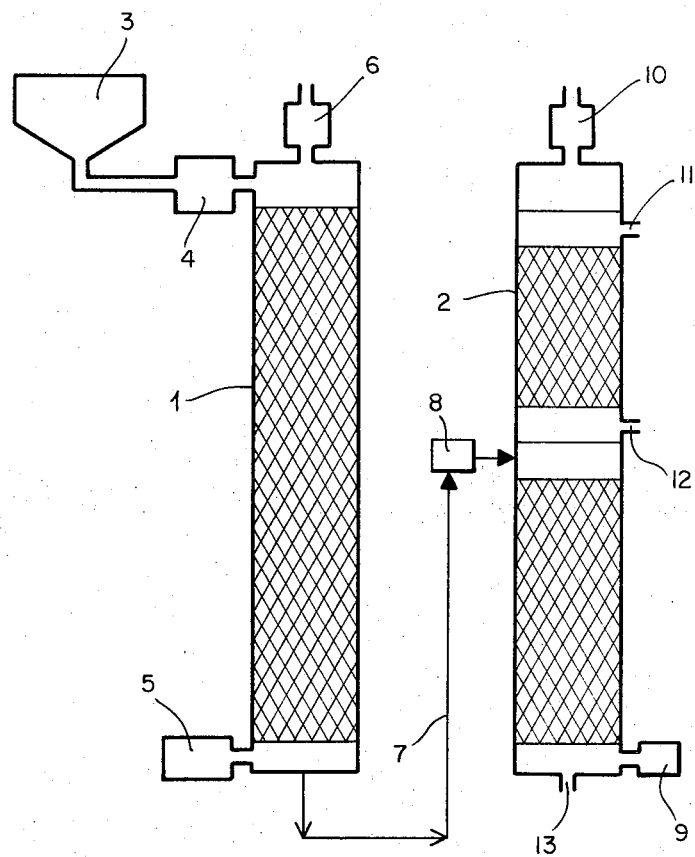

3,764,462
RECOVERY OF FURFURAL AND METHANOL FROM SPENT PULPING LIQUORS
Kenneth W. Baierl, Marysville, Wash., assignor to Scott Paper Company, Philadelphia, Pa.
Filed Sept. 9, 1971, Ser. No. 179,126
Int. Cl. D21c 11/00
U.S. Cl. 162—16
9 Claims

ABSTRACT OF THE DISCLOSURE

Chemicals, such as acetaldehyde, acetone, acetic acid, ethanol, furfural, methanol, p-cymene and sulfur dioxide, which are produced during sulfite pulping and similar operations are recovered by treating liquors and condensates containing said chemicals with steam in a fractionating column. The chemicals are further separated by refluxing the more volatile organic compounds in the fractionating column to recover methanol from the top of the column and furfural therebelow. The quality of the recovered chemicals is improved by a preliminary steam treatment of the liquors and condensates prior to their introduction into the fractionating column to recover sulfur dioxide therefrom.

BACKGROUND OF THE INVENTION

Field of the invention

The present invention relates generally to a process for recovering and separating the chemical by-products and sulfur dioxide produced during sulfite pulping and similar operations and to an apparatus for accomplishing said recovery and separation. More particularly, the invention relates to a process which comprises treating liquors and/or condensates obtained during sulfite pulping and similar operations with steam in a fractionating column and subsequently refluxing the steam separated portion to separate the more volatile organic compounds from the less volatile organic compounds, and sulfur dioxide from the organic compounds. The purity of the organic compounds obtained is improved if the process includes a pretreatment of the liquors or condensates with steam to remove sulfur dioxide prior to the introduction of the liquors or condensates into the fractionating column.

Description of the prior art

In the preparation of wood pulp useful in paper-making operations wood chips are treated, either chemically or mechanically, to separate the cellulosic fibers. In the acid sulfite pulping process wood chips are treated with a cooking liquor containing sulfur dioxide, sulfurous acid and bisulfite, usually as sodium, calcium, magnesium or ammonium bisulfite. The chemicals attack the non-fibrous materials present in the wood chips, reacting with the lignin to form water-soluble compounds, thereby allowing separation of the fibrous, or cellulosic, portion of the chips.

The treatment of the wood chips normally takes place in a digester over an extended period of time and at an elevated temperature. The exact time, temperature and pressure depend, to a considerable extent, on the species of wood and the amount of chemicals employed. To maintain a constant temperature and pressure during the chemical treatment, vapors are periodically released from the digester. Also, before the pulp is discharged from the digester the temperature and pressure are lowered by releasing additional vapors. All of these vapors are collected in high pressure accumulators and are commonly referred to as digester relief gases. The pulp and spent sulfite pulping liquor can be removed from the digester by being blown out at low pressure or dumped. During their removal additional vapors are released which are commonly referred to as digester blow gases. The digester blow gases can be condensed and the condensate collected in a hot water accumulator where it is allowed to cool and overflow into a drain. This overflow is commonly referred to as hot water accumulator overflow. The digester relief gases, digester blow gases, spent sulfite pulping liquor and hot water accumulator overflow contain chemical by-products of the pulping operation including, for example, sulfur dioxide, methanol, acetone, acetaldehyde, ethanol, furfural, p-cymene, and acetic acid. The type and amount of chemical in any given sample depends on many factors including the species of wood, treatment chemicals and cooking conditions employed.

After the fibrous pulp is separated, the cooking liquor, now commonly referred to as spent sulfite pulping liquor, and the various condensed gases, must be disposed of. In disposing of these materials both economic and environmental factors must be considered. Much effort has been expended in recent years to find an economical and practical means of disposing of the spent sulfite pulping liquor. Use of the spent sulfite pulping liquor as a road binder has been suggested as a solution to the problem. The recovery of saleable by-products has also been suggested. However, the most commonly used treatment is evaporation and subsequent burning of the concentrated liquor to produce steam and power for use in subsequent pulping operations and to recover chemicals, such as sulfur dioxide and sulfites, also for use in subsequent pulping operations.

Spent sulfite pulping liquors are known to contain, besides sulfur dioxide, organic chemicals such as methanol, ethanol, acetic acid, furfural and p-cymene. These organic compounds are formed as by-products of the pulping process. It has previously been suggested that these chemicals be recovered from the spent sulfite pulping liquor. However, no commercially acceptable process for recovering these chemicals has heretofore been available. Most of the prior art processes recovered only one of these chemicals and to recover all of them would require a series of treatments. Also, the purity of the organic chemicals recovered by the previously known processes has been poor and further processing was often required to obtain saleable products.

In U.S. Pat. 1,838,109, issued to Richter, furfural was obtained as a by-product in the preparation of wood pulp by the sulfite pulping process. The furfural was recovered by heating the spent pulping liquor, at an acid pH, to a temperature sufficient to vaporize the furfural and then condensing the vaporized furfural. This process required temperatures in excess of 250° F., which often resulted in decomposition of the fural. Also, the acid pH required was achieved by the use of sulfur dioxide gas, the presence of which has now been found to have a deleterious effect on the furfural produced. Other chemicals in the spent sulfite pulping liquor were not recoverable by this process.

In U.S. Pat. 1,223,158, issued to Enger, the "hydrocarbon cymol" was isolated from digester relief gases obtained from a sulfite pulping process by allowing the condensed gases to stand in a plurality of tanks during which time the cymol came to the top and could be separated. The liquor was then returned to the digester. The purpose of this process was not to recover the organic chemical but rather to purify the condensate so it could be reused in subsequent pulping operations.

In U.S. Pat. 1,833,955 issued to Richter, alcohol (ethanol) was obtained by fermentation of the sugars contained in partially evaporated spent sulfite pulping liquor. However, it has not heretofore been possible to separate the sulfur dioxide and the chemical by-products from sulfite pulping operations in an economical and commercial process.

SUMMARY OF THE INVENTION

In accordance with the present invention chemicals, such as acetaldehyde, acetone, acetic acid, ethanol, furfural, methanol, p-cymene and sulfur dioxide, which are produced during sulfite pulping and similar operations are recovered and separated by treating liquors and condensates containing said chemicals with steam in a fractionating column. The chemicals are further separated by refluxing the more volatile organic compounds in the fractionating column. The quality of the recovered organic chemicals is improved by a preliminary steam treatment of the liquors and condensates prior to the introduction of said liquors into the fractionating column.

BRIEF DESCRIPTION OF THE DRAWINGS

The figure is a schematic representation of an installation of apparatus employed to recover and separate chemicals in accordance with the present invention.

DESCRIPTION OF THE PREFERRED EMBODIMENTS

According to the present invention liquors, which term, as used herein, includes both liquors and condensates, produced during sulfite pulping and similar operations are treated with steam in a fractionating column to remove and separate the volatile organic compounds and sulfur dioxide contained therein. The volatile organic compounds which can be separated by this process depend to a considerable extent on the wood species and cooking conditions employed in the pulping operations and include, for example, p-cymene, furfural, acetone, methanol, ethanol, acetaldehyde and acetic acid. In general any stream containing the above-mentioned chemicals can be treated by the present process. Liquors which have been employed include spent sulfite pulping liquors, condensed digester relief gases, condensed digester blow gases, hot water accumulator overflow, and condensate from the sulfite spent liquor evaporator. Other chemical-containing liquors which can be treated include those produced by digesting corncobs, oat hulls and similar materials with dilute acid.

Apparatus useful in carrying out the recovery and separation is shown in the figure and includes a fractionating column and a steam stripper.

Fractionating column

The fractionating column is preferably a tubular column the diameter and height of which are varied in accordance with the volume or liquor being treated. The column is packed with a conventional packing such as bubble caps; sieve trays; Goodloe 316SS, a wire mesh packing available from Packed Column Corporation, Springfield, N.J.; or Intalox ¼ inch ceramic saddles available from U.S. Stoneware, Inc., Akron, Ohio. In an especially preferred apparatus, means for introducing steam into the fractionating column are attached to the lower end of the column, and a condenser is located on the top of said column to prevent loss of the volatile organic compounds. The condenser is designed so that sulfur dioxide gases can escape from the top of the column and be collected in a sulfur dioxide recovery system. Means on the side of the column, preferably at a point above the middle of said column, are designed for introducing liquors from the sulfite pulping operation into the column. As used herein the term liquors refers to both liquors and condensed gases. It has been found that the separation of the volatile organic compounds present in said liquors is improved if the liquor is preheated to its bubble point prior to its introduction into the fractionating column. It is especially preferred to heat the liquors to a temperature of from about 95° C. to about 99° C. For this reason it is especially preferred to include a preheater for the liquors being introduced into the column.

Two taps and internal means for the removal of the volatile organic compounds separated from the liquors are located, one above the other, on the side of the column above the point where the liquors are introduced into said column. The upper tap is designed for the removal of more volatile organic compounds, such as methanol, and the lower tap for the removal of the less volatile organic compounds, such as furfural.

In operation, chemical-containing liquors are introduced into the fractionating column at a rate dependent on the size of said column. It is especially preferred, when working with a column having an inside diameter of 4 inches and a packed height of 20 feet, to introduce the liquors at a rate of from about 0.5 gallon per minute to about 1.5 gallons per minute. Steam is simultaneously introduced into the column in an amount equal to from about 1.0% to about 10.0% of the weight of the liquor. As the liquors pass down the column the steam removes the volatile organic compounds and sulfur dioxide contained in said liquors. The stripped liquors pass from the lower end of the column to a recovery system wherein they are either disposed of or evaporated and burned to remove the pulping chemicals contained therein. The steam containing the volatile organic compounds and sulfur dioxide travels up the column and the more volatile organic compounds are refluxed at the top of said column. This refluxing of the more volatile organic compounds prevents the less volatile organic compounds, such as furfural and p-cymene, from moving up the column and the water, by forming an azeotrope with them, prevents the more volatile organic compounds from passing to the bottom of the column.

By this process the chemicals are separated and can be recovered from the column in several fractions. The first fraction removed from the condenser attached to the top of the column is a sulfur dioxide vapor containing at least 80% by weight sulfur dioxide. When working with a sulfite pulping operation this fraction can be reused in the preparation of cooking liquor for use in subsequent pulping operations. The second fraction removed as a liquid from the tap near the top of the fractionating column is a mixture of the more volatile organic compounds such as methanol, ethanol, acetone and acetaldehyde. The third fraction removed from the tap closer to the center of the column contains furfural in an amount equal to up to 94% by weight of the fraction. The final fraction, which may or may not be present depending on the species of wood employed, removed from the column by a third tap located below that by which the furfural is removed contains p-cymene.

STEAM STRIPPER

It has been found that the purity of the organic compounds isolated from the fractionating column can be improved if at least part of the sulfur dioxide is removed from the liquors prior to the introduction of said liquors into said fractionating column. A pretreatment of the liquors with steam prior to the introduction of the liquors into the fractionating column has been found to be especially useful for removing the sulfur dioxide. An apparatus which is especially preferred for carrying out the sulfur dioxide removal is a steam stripper which comprises a tubular column, the diameter and height of which are varied in accordance with the volume of liquor being treated. The column is packed with a conventional packing such as bubble caps; sieve trays; Goodloe 316SS, a wire mesh packing available from Packed Column Corporation, Springfield, N.J.; or Intalox ¼ inch ceramic saddles available from U.S. Storeware, Inc., Akron, Ohio. In this especially preferred apparatus, means for introducing steam are attached to the lower end of said column and a means for collecting sulfur dioxide gases and introducing said gases into a sulfur dioxide recovery system are attached to the upper end of the column. Means, preferably near the upper end of the column, are designed for introducing liquors into the column. It has been found that the separation of the sulfur dioxide present in said liquors is improved if the liquors are preheated prior to introduction into the steam stripping column. For this reason it is especially preferred to include a preheater for the liquors being introduced into the column.

In operation liquors are introduced into the steam stripping column at a rate dependent on the size of said column. It is especially preferred, when working with a column having an inside diameter of 4 inches and a height of 4 feet, to introduce the liquors at a rate of from about 1.0 gallon per minute to about 2.0 gallons per minute. Steam is simultaneously introduced into the column in an amount equal to from about 1.0% to about 5.0% of the weight of the liquor. As the liquor passes down the column the steam removes the sulfur dioxide contained in said liquor. The stripped liquor passes from the lower end of the column to the fractionating column described above. Sulfur dioxide gases pass out the top of the column and are collected in a sulfur dioxide recovery system.

Referring now to the drawing, the figure is a schematic representation of an apparatus employed to recover and separate chemicals in accordance with the present invention. The apparatus comprises a steam stripper 1 and a fractionating column 2. In operation chemical-containing liquors and condensates from sulfite pulping and similar operations are collected in a storage unit 3 from which they are fed through a feed preheater 4 and into the top of the steam stripper. A steam source 5 is attached to the lower end of the steam stripper and an outlet 6 for the removal of sulfur dioxide is attached to the upper end of the stripper. After treatment with steam in the steam stripper the liquors pass through a line 7 and a second feed preheater 8 into the fractionating column at a point above the middle of said column. The fractionating column has a steam source 9 attached to the lower end of the column and a condenser 10 is attached to the top. Two taps 11 and 12 for the removal of the volatile organic compounds are located on the side of the column. The upper tap 11 is designed for the removal of the more volatile organic compounds and the lower tap 12 for the removal of the less volatile organic compounds. An outlet 13 is provided at the bottom of the column for the removal of the treated liquors and condensates.

In order to describe the present invention so that it may be more clearly understood, the following examples are set forth. These examples are set forth primarily for the purpose of illustration, and any specific enumeration of detail contained therein should not be interpreted as a limitation on the concept of this invention.

EXAMPLE I

A mixture of wood chips consisting of 80% hemlock and 20% white fir were reduced to a pulp by the sulfite pulping process. The hot water accumulator overflow was collected, heated to a temperature of 99° C. and introduced into the top of a steam stripper. The stripper consisted of a tubular glass column having an inside diameter of 4 inches and a height of 82 inches and was packed with 48 inches of Goodloe Packing 316SS, a wire mesh packing available from Packed Column Corporation, Springfield, N.J. The rate of introduction of accumulator overflow was adjusted to 1.52 gallons per minute. Steam was simultaneously introduced into the lower end of the steam stripper at a rate equal to about 1.5% of the weight of the accumulator overflow, or about 11 pounds per hour.

The accumulator overflow entering the steam stripper contained:

| | Percent |
|---|---|
| Sulfur dioxide | 0.32 |
| Methanol | 0.10 |
| Ethanol | 0.01 |
| Acetic acid | 0.06 |
| Furfural | 0.03 |

All percentages were based on the total weight of the accumulator overflow.

After treatment with steam in the steam stripper the liquor removed from the bottom of said unit contained:

| | Percent |
|---|---|
| Sulfur dioxide | 0.006 |
| Methanol | 0.08 |
| Ethanol | 0.01 |
| Acetic acid | 0.05 |
| Furfural | 0.03 |

The sulfur dioxide leaving the top of the unit was equal to approximately 98.0% of the sulfur dioxide originally present in the accumulator overflow.

EXAMPLE II

The liquor removed from the bottom of the steam stripper in Example I was heated to a temperature of 99° C. and introduced into a fractionating column. The fractionating column consisted of a tubular glass column having an inside diameter of 4 inches and a height of 260 inches. The column was packed with 144 inches of ¼ inch Intalox ceramic saddles available from U.S. Storeware, Inc., Akron, Ohio at the lower end, i.e., below the point at which the liquor was introduced into said column, and 48 inches of Goodloe 316SS packing. The rate of introduction of liquor was adjusted to 0.38 gallon per minute and steam was simultaneously introduced into the lower end of said column at a rate equal to about 12% of the weight of the liquor or about 22 pounds per hour.

Liquor entering the fractionating unit contained:

| | Percent |
|---|---|
| Sulfur dioxide | 0.006 |
| Methanol | 0.08 |
| Ethanol | 0.01 |
| Acetic acid | 0.05 |
| Furfural | 0.03 |

After being treated with steam the liquor removed from the lower end of said column contained:

| | Percent |
|---|---|
| Sulfur dioxide | ---- |
| Methanol | 0.02 |
| Ethanol | 0.001 |
| Acetic acid | 0.05 |
| Furfural | 0.01 |

This liquor was collected and, after further purification, can be recycled back to the pulp mill as reusable water for preparing sulfite cooking liquor.

The steam, containing volatile organic chemicals and a trace of sulfur dioxide passed up the column where the more volatile organic compounds, primarily methanol, were refluxed until a separate layer of the less volatile organic compounds, primarily furfural, was formed in the column directly above the point where the liquor was introduced into the column. When the temperature of the vapor at the top of the column reached 66° C. the more volatile organic compounds where removed at a rate sufficient to maintain the vapor temperature of 66° C. at the top o fthe column. The furfural layer was removed from the column by an overflow splitter which allowed the water to flow down the column while separating the furfural which is heavier than the water.

The amount of furfural, which was approximately 86% pure, was equal to from about 60% to 70% of the furfural present in the liquor entering the fractionating column.

The amount of methanol, which was approximately 97% pure, was equal to from about 70% to 80% of the methanol present in the liquor entering the fractionating column.

EXAMPLE III

A mixture of wood chips consist ingof 80% hemlock and 20% white fir were reduced to a pulp by the sulfite pulping process. The spent sulfite pulping liquor was collected, heated to a temperature of 98° C. and introduced into the top of a steam stripper. The stripper consisted of a tubular glass column having an inside diameter of 4 inches and a height of 82 inches and was packed with 30 inches of Goodloe 316SS packing and 18 inches of Intalox ¼ inch ceramic saddles. The rate of introduction of spent sulfite pulping liquor was adjusted to 0.6 gallon per minute. Steam was simultaneously introduced into the lower end of the steam stripper at a rate equal to about 1.3% of the weight of the spent sulfite pulping liquor, or about 4 pounds per hour.

The spent sulfite pulping liquor entering the steam stripper contained:

|  | Percent |
|---|---|
| Sulfur dioxide | 0.37 |
| Methanol | 0.08 |
| Furfural | 0.035 |
| Acetic acid | 0.35 |

All percentages were based on the total weight of the spent sulfite pulping liquor.

After treatment with steam in the steam stripper, the liquor removed from the bottom of said unit contained:

|  | Percent |
|---|---|
| Sulfur dioxide | 0.21 |
| Methanol | 0.04 |
| Furfural | 0.022 |
| Acetic acid | 0.35 |

This liquor can be treated in a fractionating column as in Example II. The vapor removed from the top of the steam stripper, which contained 3.27% sulfur dioxide, 0.51% methanol, 0.15% furfural and 0.32% acetic acid, was also treated in a fractionating column to separate the sulfur dioxide and the organic chemicals contained therein. At least 90% of the methanol and 90% of the furfural were recovered from the fractionating column.

EXAMPLE IV

A mixture of wood chips consisting of 66% softwood (spruce and balsam fir) and 34% hardwood (birch) were reduced to a pulp by the sulfite pulping process. The spent sulfite pulping liquor was collected and evaporated to from about 10% to about 50% solids. The evaporator condensate was collected, heated to 98° C. and introduced into the steam stripper described in Example III. The rate of introduction of the condensate was adjusted to 0.5 gallon per minute. Steam was simultaneously introduced into the lower end of the steam stripper at a rate equal to about 2.0% of the weight of the condensate, or about 5 pounds per hour.

The evaporater condensate entering the stream stripper contained:

|  | Percent |
|---|---|
| Sulfur dioxide | 0.12 |
| Methanol | 0.12 |
| Furfural | 0.12 |
| Acetic acid | 0.60 |

All percentages were based on the total weight of the evaporator condensate.

After treatment with steam in the steam stripper, the liquor removed from the bottom of said unit contained:

|  | Percent |
|---|---|
| Sulfur dioxide | --- |
| Methanol | 0.06 |
| Furfural | 0.06 |
| Acetic acid | 0.60 |

The liquor can be treated in a fractionating column as in Example II. The vapor removed from the top of the stream stripper, which contained 2.0% sulfur dioxide, 2.0% methanol and 2.0% furfural, was also treated in a fractionating column resulting in the recovery of at least 90% of the methanol and 90% of the furfural contained in said vapor.

EXAMPLE V

A sample of the evaporator condensate collected from a sulfite pulping process as described in Example IV was heated to 98° C. and introduced directly into a fractionating column consisting of a tubular glass column having an inside diameter of 4 inches and a height of 260 inches. The column was packed with 144 inches of Goodloe 316SS at the lower end, i.e., below the point at which the condensate was introduced into said column. The rate of introduction of condensate was adjusted to 0.5 gallon per minute and steam was simultaneously introduced into the lower end of said column at a rate equal to about 10% of the weight of the evaporator condensate, or about 26 pounds per hour.

The evaporator condensate entering the fractionator contained:

|  | Percent |
|---|---|
| Sulfur dioxide | 0.075 |
| Methanol | 0.13 |
| Furfural | 0.17 |
| Acetic acid | 0.52 |

After being treated with steam the liquor removed from the bottom of said column contained:

|  | Percent |
|---|---|
| Methanol | 0.006 |
| Furfural | 0.011 |
| Acetic acid | 0.5 |

Methanol and furfural were removed from the column as in Example II and a high concentration sulfur dioxide vapor was discharged from the condenser at the top of the column.

The amount of furfural, which was approximately 91% pure, was equal to from about 90% to 95% of the furfural present in the evaporator condensate entering the fractionating column.

The amount of methanol, which was approximately 93% pure, was equal to from about 95% to 96% of the methanol present in the evaporator condensate entering the fractionating column. Small amounts of methanol, acetone and acetaldheyde were subsequently separated from the methanol.

EXAMPLE VI

Lodgepole pine wood chips are pulped by the sulfite pulping process and the evaporator condensate collected as in Example IV. The evaporator condensate contains approximately 0.01% sulfur dioxide, 0.15% methanol, 0.20% furfural, 0.20% p-cymene and 0.5% acetic acid. The fractionating column employed in Example V is modified to include a second overflow splitter below that by which the furfural layer is removed and above the point at which the evaporator condensate is introduced into the column.

The evaporator condensate is introduced into one column, treated with steam and the chemicals present are separated as in Example II. The fraction removed from the column by the second overflow splitter is essentially pure p-cymene.

What is claimed is:

1. A process for recovering and separating chemicals produced during sulfite pulping and similar operations which comprises:
   (a) treating chemical-containing liquors from said operations with steam in a fractionating column to separate volatile organic compounds and sulfur dioxide contained in said liquors,
   (b) removing the sulfur dioxide from the top of said column,
   (c) refluxing the volatile organic compounds to produce an immiscible heavier-than-water fraction containing furfural and a stripped water containing fraction below said immiscible fraction,
(d) removing a portion of the volatile organic compounds from a first tap located near the top of the fractionating column,
(e) removing the immisicible fraction from a second tap located below the first tap, and
(f) removing the stripped water containing fraction from the bottom of the column.

2. A process, as claimed in claim 1, in which the chemicals recovered comprise sulfur dioxide, more volatile organic compounds selected from the group consisting of methanol, ethanol acetaldehyde and acetone and the water immiscible layer containing less volatile organic compounds selected from the group consisting of furfural and p-cymene.

3. A process, as claimed in claim 1, in which the chemical-containing liquors are treated with steam, to remove part of the sulfur dioxide contained therein, prior to introduction into the fractionating column.

4. A process, as claimed in claim 3, in which the amount of steam is equal to from 0.5% to 5.0% of the weight of the liquors.

5. A process, as claimed in claim 1, in which the chemical-containing liquor is spent sulfite pulping liquor.

6. A process, as claimed in claim 5, in which the chemicals recovered comprise sulfur dioxide, methanol and furfural.

7. A process, as claimed in claim 1, in which the chemical-containing liquors are heated to a temperature of from 95° C. to 99° C. prior to introduction into the fractionating column.

8. A process, as claimed in claim 1, in which the chemical-containing liquors contain p-cymne which is removed from the column as a second immiscible fraction from a third tap located below the second tap.

9. A process, as claimed in claim 1, in which the immiscible heavier-than-water fraction contains furfural in an amount equal to up to 94% by weight of the fraction.

References Cited

UNITED STATES PATENTS

| | | | |
|---|---|---|---|
| 2,845,441 | 7/1958 | Morse et al. | 260—347.9 |
| 2,710,254 | 6/1955 | Blaricom et al. | 162—16 |
| 2,797,191 | 6/1957 | Jarboe et al. | 203—98 |

FOREIGN PATENTS

| | | | |
|---|---|---|---|
| 356,470 | 1957 | Switzerland | 162—16 |

S. LEON BASHORE, Primary Examiner

A. D'ANDREA, JR., Assistant Examiner

U.S. Cl. X.R.

162—15; 203—98; 260—347.9

PO-1050
(5/69)

UNITED STATES PATENT OFFICE
CERTIFICATE OF CORRECTION

Patent No. 3,764,462     Dated 10/9/73

Inventor(s) Kenneth W. Baierl

It is certified that error appears in the above-identified patent and that said Letters Patent are hereby corrected as shown below:

Column 2, line 51, "fural" should be --furfural--

Column 8, line 44, "methanol" should be --ethanol--

Signed and sealed this 19th day of March 1974.

(SEAL)
Attest:

EDWARD M. FLETCHER, JR.
Attesting Officer

C. MARSHALL DANN
Commissioner of Patents